June 22, 1965  G. W. RICHMOND  3,189,979
METHOD AND APPARATUS FOR SIMULTANEOUSLY FORMING
SPHERICALLY CONTOURED BEARING SEATS AND
LOADING SLOTS IN BEARING HOUSINGS
Filed April 9, 1963  6 Sheets-Sheet 1
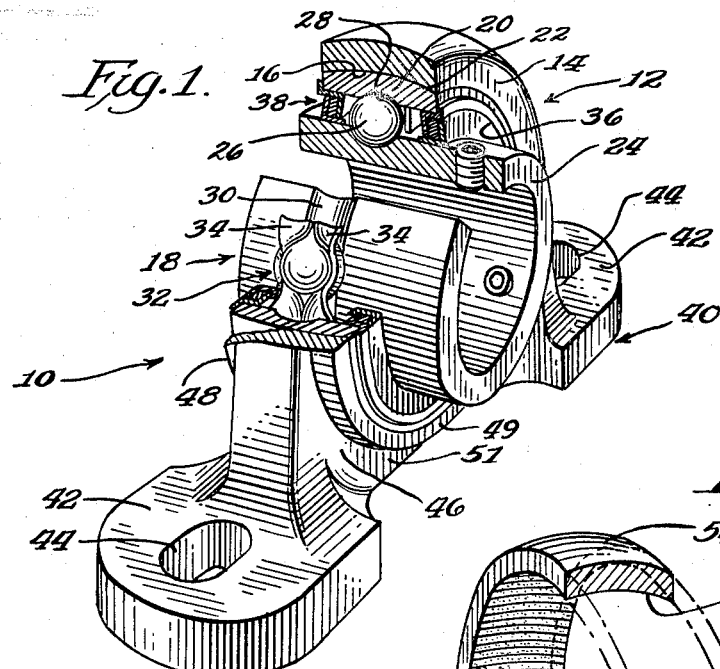
Fig.1.
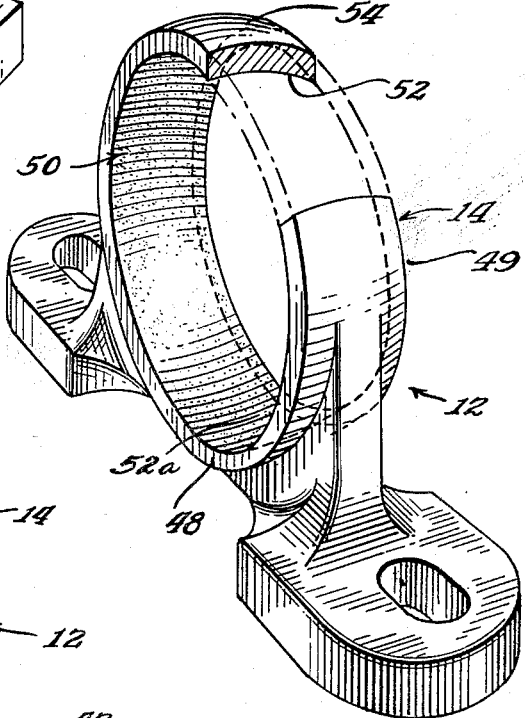
Fig.2.
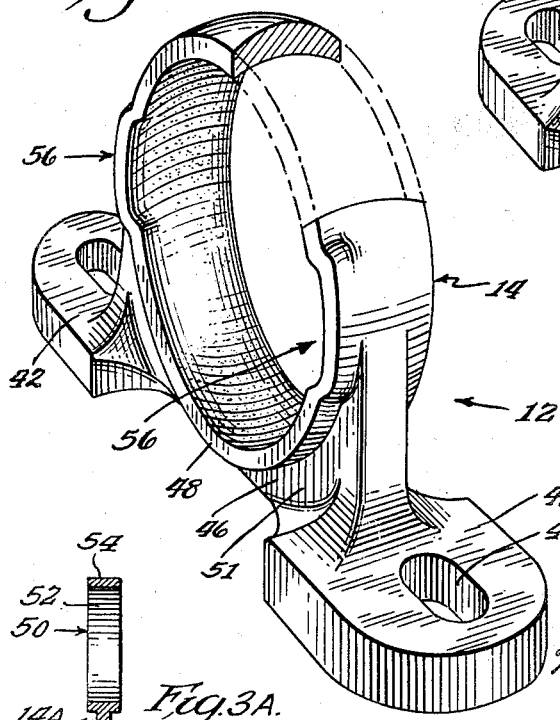
Fig.3.
Fig.3A.
Inventor
Gerald W. Richmond
By
Mann, Brown & McWilliams
Attys.

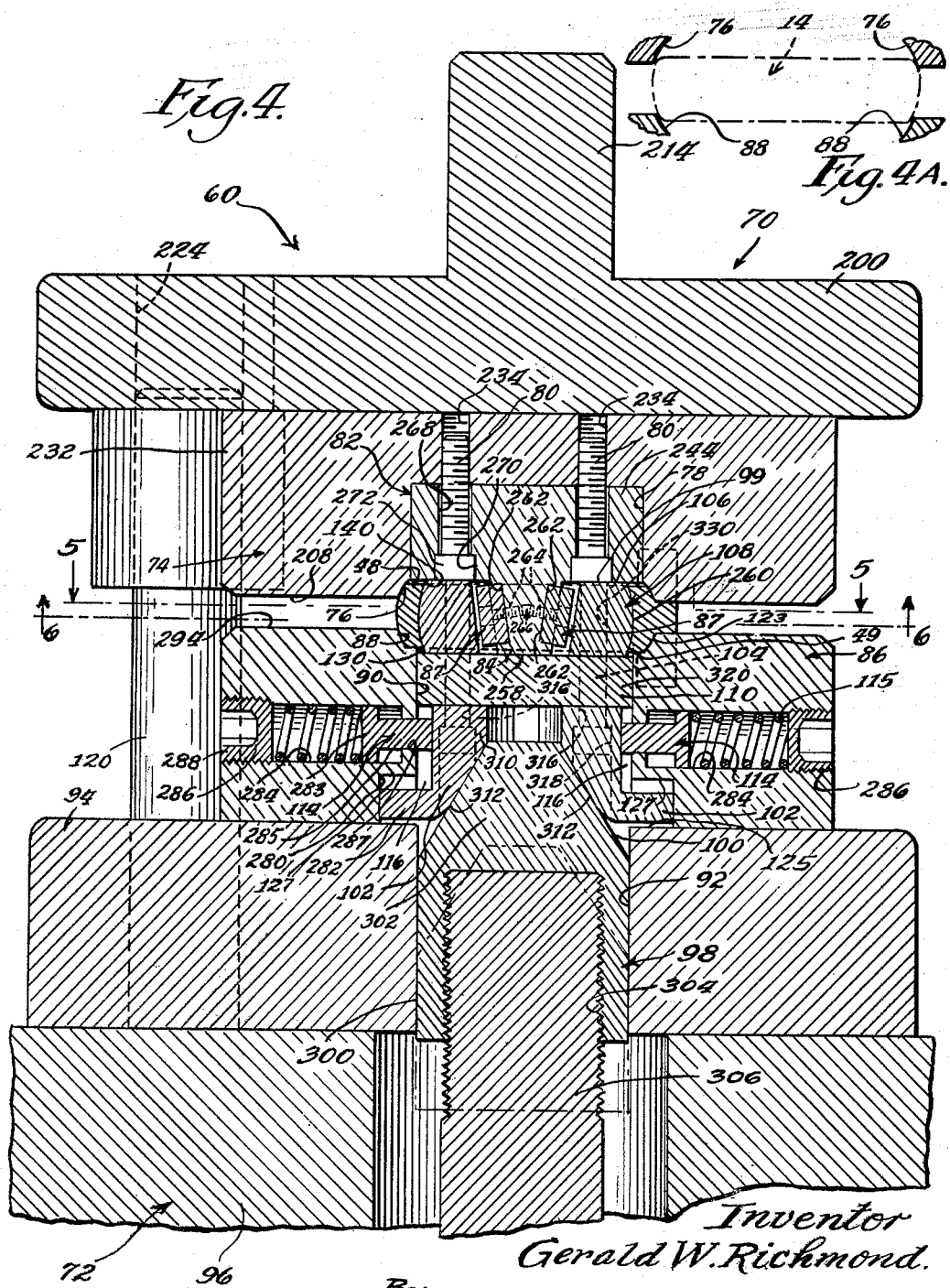

June 22, 1965  G. W. RICHMOND  3,189,979
METHOD AND APPARATUS FOR SIMULTANEOUSLY FORMING
SPHERICALLY CONTOURED BEARING SEATS AND
LOADING SLOTS IN BEARING HOUSINGS
Filed April 9, 1963  6 Sheets-Sheet 4
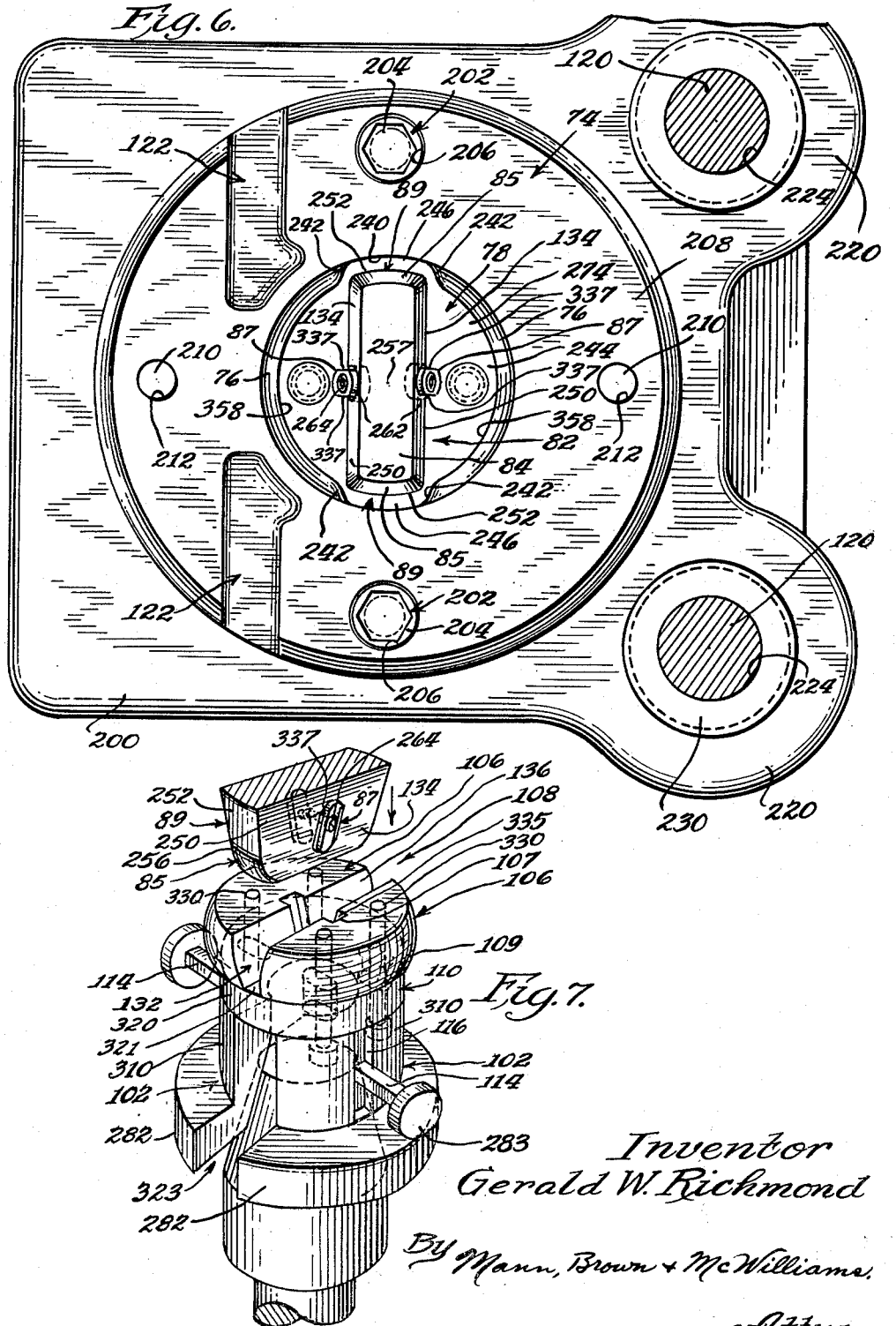

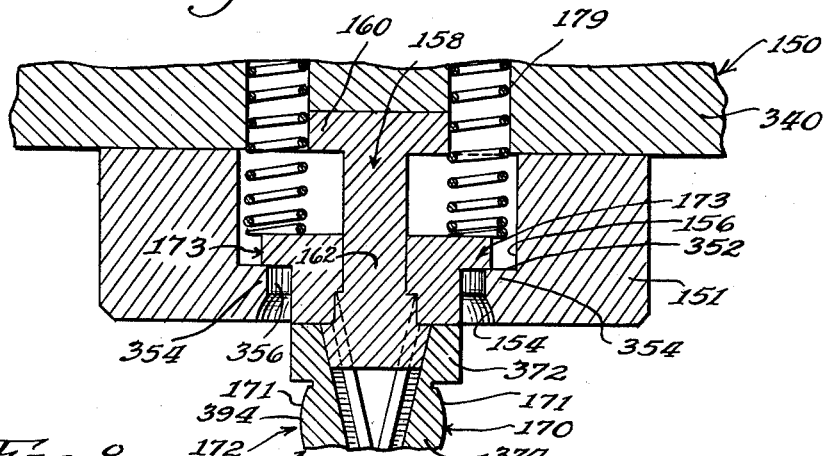
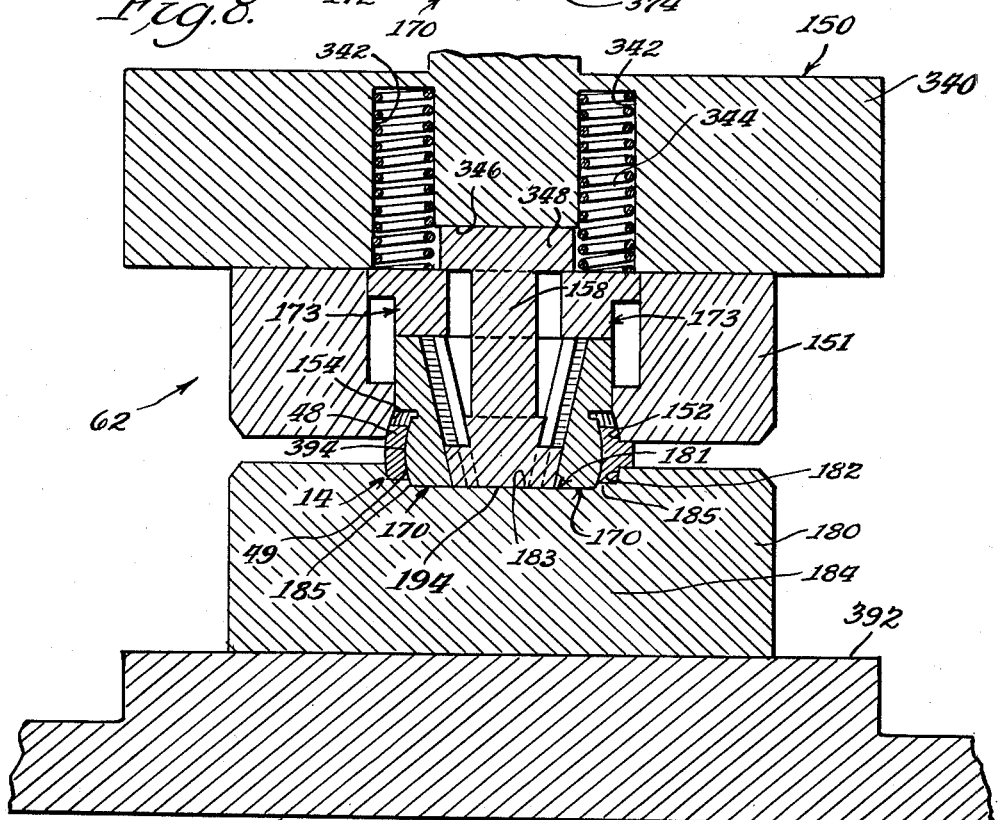

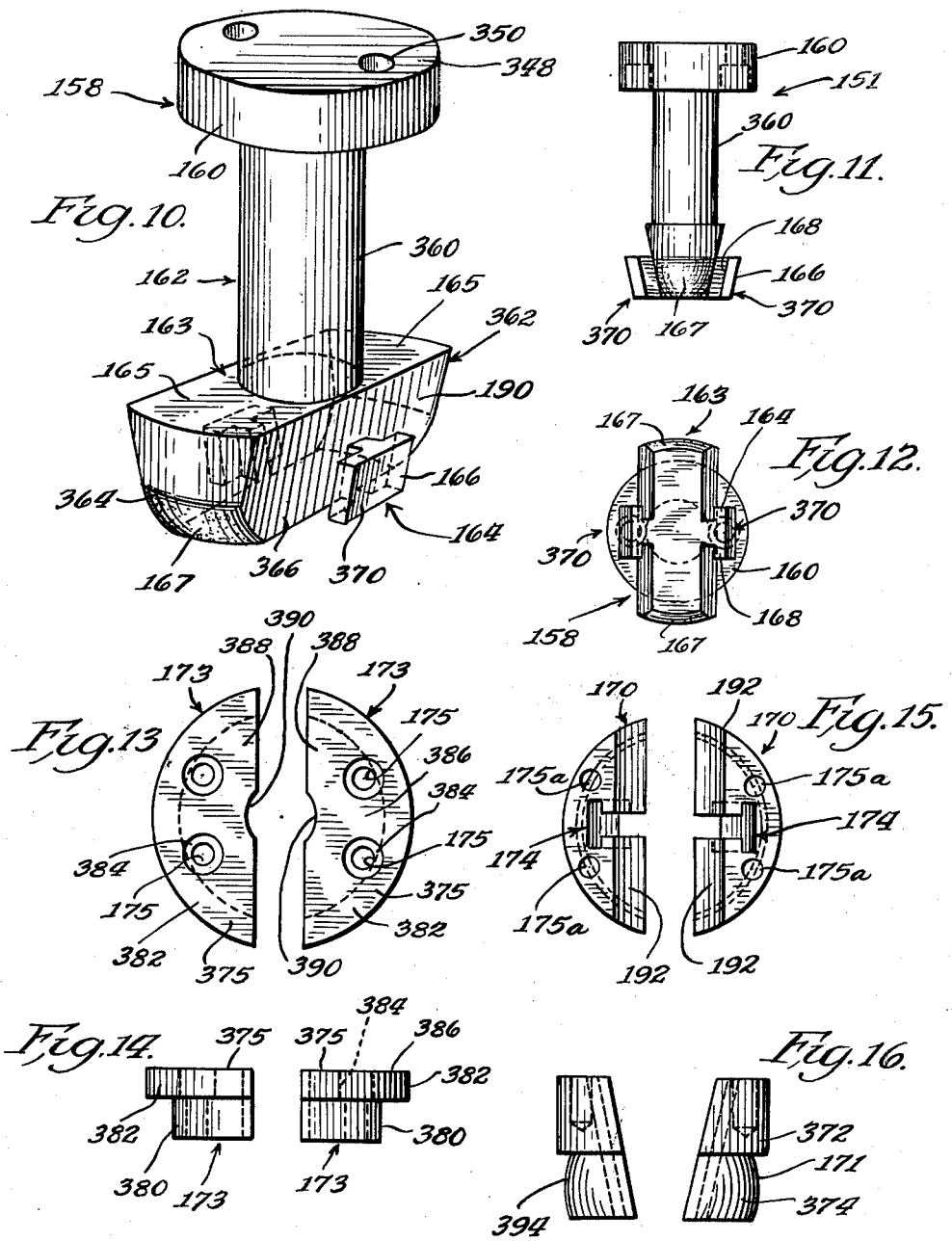

United States Patent Office 3,189,979
Patented June 22, 1965

3,189,979
METHOD AND APPARATUS FOR SIMULTANE-OUSLY FORMING SPHERICALLY CONTOURED BEARING SEATS AND LOADING SLOTS IN BEARING HOUSINGS
Gerald Wayne Richmond, Montgomery, Ill., assignor to Stephens-Adamson Mfg. Co., a corporation of Illinois
Filed Apr. 9, 1963, Ser. No. 271,813
17 Claims. (Cl. 29—148.4)

My invention relates to ball bearing units of the type shown in Glavan et al. Patent 2,952,898 and Glavan et al. Patent 3,001,841, which disclose pillow block and flange type ball bearing units having housings of the "massive" type, that is, the housings are cast or forged as distinguished from being stamped sheet metal housings.

Prior to the inventions described in said patents, housings for pillow block, flange, and similar types of ball bearing units were made in either two parts that had to be clamped together to seat the ball bearing assembly in same, or the housing had to be of the one-piece type provided with loading slots that permitted the bearing assembly to be slipped into place edgewise and then rotated into its normal position.

The inventions of the above and related patents relate to making of ball bearing units using the swaging principle of forming the bearing seat in the housing of the bearing, in which the housing is swaged about the bearing assembly outer race, prior to assembly of the inner race and bearing balls within the outer race.

The present invention is directed to solving practical manufacturing and inventory problems that are involved in bearing units of the types disclosed in said patents, while still retaining the swaging principle. These problems have to do with the fact that the bearing assembly is assembled after the outer race is applied to the housing, which adds somewhat to assembly costs, and once the outer race is applied to the housing, it cannot be removed without destroying the unit.

For instance, once the ball bearing assembly (which comprises the inner and outer races, the balls that are mounted in the ball race grooves of the inner and outer races, the ball retainer devices that space the balls equidistantly about the races, and suitable sealing devices, all assembled as described in said patents) is applied to a particular housing, such as a pillow block housing, this commits that bearing assembly to one particular type of sale, in that the ball bearing assembly would not be sold until there was an order for that particular type of pillow block unit.

Therefore, a principal object of this invention is to provide method and apparatus for making bearing seats, in housings of the general types disclosed in said patents, on the swaging principle, while also simultaneously forming loading slots in the bearing housings for ready application and removal of the preassembled bearing assembly.

Another important object of this invention is to provide a method and apparatus for the swage forming of bearing seats in bearing housings of the type indicated without using the outer race itself as the swaging former.

Yet another important object of the invention is to provide a method and apparatus for the simultaneous swage forming of the bearing seat and loading slots in bearing housings of the massive type.

Other objects of the invention are to provide an improved swage formed bearing housing structure that is especially adapted for selective application of ball bearing assemblies, and to provide a method and apparatus for making bearing units that is economical, efficient, and effective for use in connection with the making of a wide variety of bearing units.

Still other objects, uses and advantages will obvious or become apparent from a consideration of the detailed description and the application drawings.

In the drawings:

FIGURE 1 is a perspective view, partially in section, showing a completed ball bearing pillow block type unit of the type to which this invention relates;

FIGURE 2 is a perspective view, partially in section, showing one form of pillow block blank that may be used in the fabrication of pillow block ball bearing units arranged in accordance with this invention;

FIGURE 3 is similar to FIGURE 2, but shows the housing of FIGURE 2 after it has been processed in accordance with this invention and is ready to receive a preassembled ball bearing assembly of the type illustrated in FIGURE 1;

FIGURE 3A is a sectional view, along the axis of the bearing housing, illustrating another form of housing that may be processed in accordance with this invention to provide the housing shape shown in FIGURE 3;

FIGURE 4 is a vertical cross-sectional view through one form of swaging apparatus that may be employed in accordance with this invention to arrive at the pillow block housing shape of FIGURE 3, which view is taken substantially along line 4—4 of FIGURE 5, and shows the die structure in its fully closed position;

FIGURE 4A is a diagrammatic fragmental view that is similar to the showing of FIGURE 4, but shows how the die swaging surfaces should initially engage the bearing housing prior to the start of the die swaging action, with the swaging surfaces and the housing being shown largely in block diagram form;

FIGURE 6 is a bottom plan view of the upper die plate structure shown in FIGURE 4, and is substantially along the line 6—6 of FIGURE 4, looking in the direction of the arrows;

FIGURE 7 is a diagrammatic perspective view illustrating the functioning of the principal components of the die structure shown in FIGURES 4–6;

FIGURE 8 is a view similar to that of FIGURE 4, but illustrating a modified form of swaging apparatus that may be employed to form the pillow block housing of FIGURE 3 in accordance with this invention;

FIGURE 9 is a view similar to FIGURE 8, but shows only the top or upper die plate structure in its retracted or inoperative position;

FIGURE 10 is a perspective view illustrating the punch or cam member of FIGURES 8 and 9;

FIGURES 11 and 12 are side elevational and bottom plan views, respectively, of the component shown in FIGURE 10;

Figure 5:
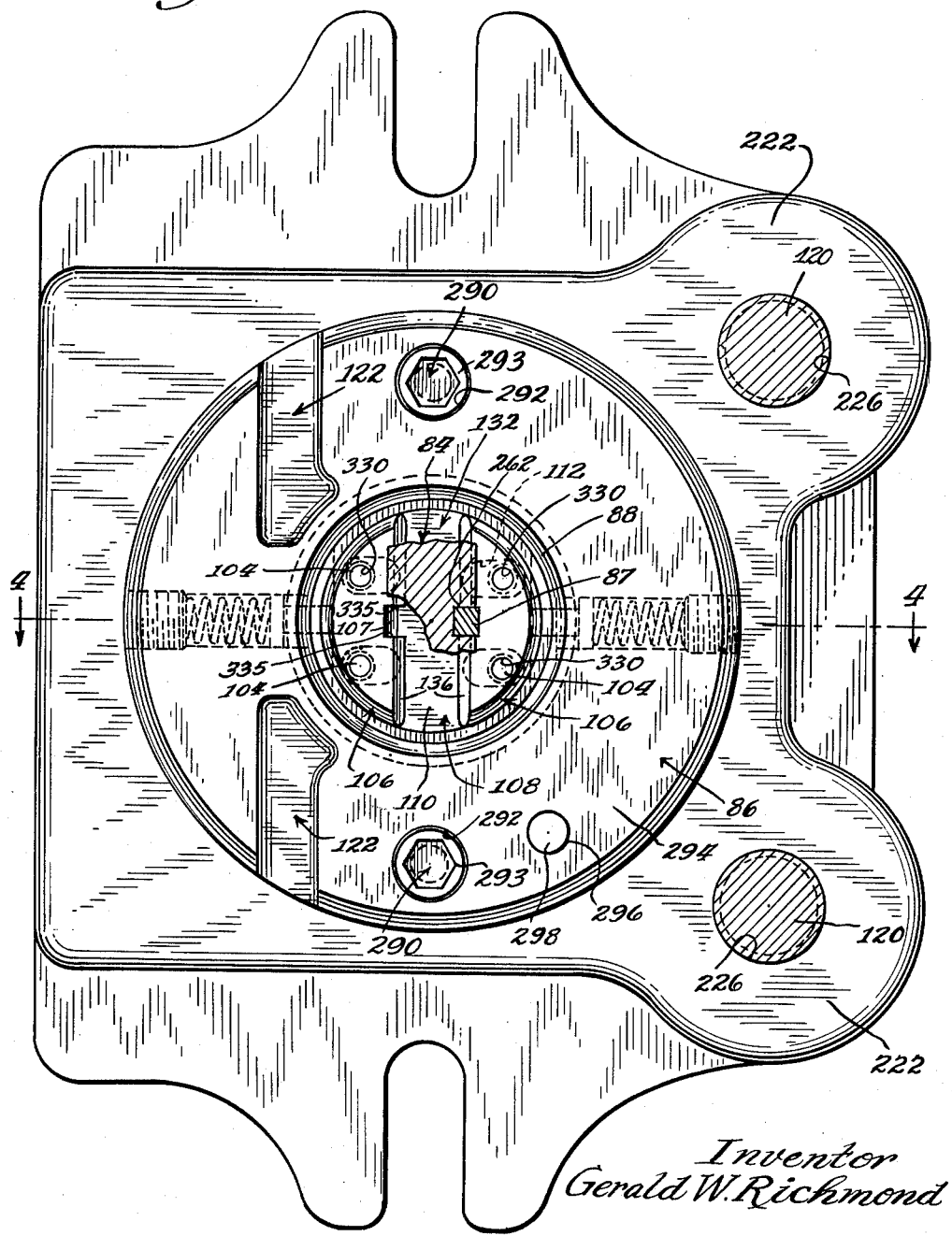
FIGURE 5 is a top plan view of the lower die plate structure shown in FIGURE 4, and is substantially along line 5—5 of FIGURE 4, looking in the direction of the arrows, with parts broken away to facilitate illustration.

FIGURES 13 and 14 are top plan and side elevational views, respectively, of the former element pusher member components of FIGURES 8 and 9; and FIGURES 15 and 16 are top plan and side elevational views, respectively, of the swaging former elements employed in the embodiment of FIGURES 8 and 9.

However, it should be understood that the specific embodiments shown in the drawings are provided primarily to comply with the requirements of 35 U.S.C 112, and that the invention may take other forms that will be obvious to those skilled in the art.

*General description of bearing unit*

Referring now more specifically to FIGURE 1 of the drawings, reference numeral 10 generally indicates a pillow block ball bearing unit of the type that may be made in accordance with my invention.

The bearing unit 10 generally comprises a pillow block type housing 12 provided with an annular housing portion 14 that is formed with a spherically contoured annular bearing seat 16 in which is swivelably mounted a ball bearing assembly 18.

The ball bearing assembly 18 comprises an outer race 20 provided with a spherically contoured external surface or periphery 22 that is complementary to and coacts with the housing portion bearing seat 16, an inner race 24, a plurality of bearing balls 26 mounted in the ball race grooves 28 and 30 of the respective races, a suitable type of ball retainer device 32, which in the form shown comprises a pair of rings 34 that are formed and riveted or clamped together in any conventional manner to space the balls 26 equidistantly from each other, and sealing ring assemblies 36 and 38 applied between the inner and outer races on either side of the ball bearings to form a seal for the bearing unit.

The housing 12 further comprises a base 40 provided with a pair of feet or lugs 42 that are formed with suitable openings 44 for the reception of mounting screws or bolts or the like. The annular housing portion 14 of the pillow block housing 12 defines an opening 50, and is connected to the feet or lugs 42 by an upstanding vertical wall portion 46, and in the form shown, the annular housing portion 14 defines end portions 48 and 49 that project the beyond side surfaces 51 of the wall portion 46.

The housing 12 in accordance with this invention is initially formed to either of the shapes suggested in FIGURES 2 or 3A by preferably being cast or forged in one piece from a material such as ductile cast iron, nodular iron, malleable iron, perlitic malleable iron, Meehanite, bronze, aluminium bronze, or any other suitable ductile or malleable material. The housing may also be forged to the shapes indicated in FIGURES 2 and 3A from a suitable steel such as SAE 4130, 410 SS (stainless steel), aluminum, or any other suitable forging material.

In the shape shown in FIGURE 3A, the annular housing portion 14A is formed to define an opening 50 that is cylindrical in configuration, in which housing the interior wall 52 and the exterior wall 54 of the housing portion 14 are substantially cylindrical in configuration and concentric in arrangement. However, the die cast or forged shape of the housing portion 14A surface 52 may be slightly concave if so desired, and in the commercial form of this invention shown in FIGURE 2 (which is a cast housing), the internal surface 52a at the end 49 of housing portion 14 is approximately spherical in configuration, with the end portion 49 thus being somewhat narrower in internal diameter than the other end portion 48 (which is substantially cylindrical in configuration). The particular housing of FIGURE 2 is a green sand cast housing in which the core that defines the opening 50 of housing portion 14 is shaped to provide a draft angle in the area of the larger end 48 of the housing portion. The narrow end 49 of the housing portion is made approximately spherical in contour to aid in the swaging processing that is about to be described, making surface 52 of housing portion 14 cylindrical in shape at housing end 48 and spherically contoured at end 49.

In accordance with this invention, the housing 12, either in the form shown in FIGURE 2 or the form shown in FIGURE 3A, in substantially the same condition that it is in as it emerges from the mold, is processed either by the machine 60 of FIGURES 4–7, or the machine 62 of FIGURE 8–16, to provide the pillow block housing configuration shown in FIGURE 3, which has all the features described in connection with FIGURE 1, except that the housing also includes loading slots 56 formed in end 48 of housing portion 14 for receiving preassembled bearing assemblies 18.

*Method and apparatus for making product*

Turning first to the apparatus 60 of FIGURES 4–7, the apparatus 60 generally comprises an upper, reciprocably mounted die plate structure 70, and a lower, fixed die plate structure 72 (which normally includes a conventionally arranged press bed). The die plate structure 70 includes an upper swaging die plate 74 formed with spherically contoured swaging surfaces 76 (see FIGURES 4 and 6) that are to engage the end portion 48 of the pillow block housing shown in FIGURE 2 to form the configuration indicated in FIGURE 3 in cooperation with the other components of apparatus 60. The die plate 74 is formed to define a recess 78 in which is secured by appropriate screws or bolts 80 a punch or cam member 82 having a projecting end portion 84 provided with the general configuration shown in FIGURE 7, and thus includes spherically contoured edge portions 85.

The lower die plate structure 72 includes a lower swaging die plate 86 provided with an annular endless spherically contoured swaging surface 88 that is to contact the end portion 49 of the pillow block housing 12 to define the configuration shown in FIGURE 3, in conjunction with the other components of the apparatus 60. The die plate 86 is formed with a rounded central opening 90, which is positioned in axial alignment with a bore or opening 92 that is formed in a base plate structure 94 which is supported in any suitable manner as on the press bed 96.

Reciprocably mounted in the bore 92 is a cam pin 98 formed with a conical camming surface 100 that engages a pair of cam followers 102, which are respectively secured by appropriate screws 104 to a pair of former elements 106 having spherically contoured edge surfaces 109; elements 106 when considered together comprise a contractible and expandable swage forming device 108.

The former elements 106 and projecting end portion 84 of punch or cam member 82 have their spherically contoured edge portions 109 and 85, respectively, complementarily related so that when these are brought together in swage forming the housing portion 14, the surfaces 109 and 85 will form the spherically contoured bearing seat 16, while the sides 89 of member 82 define the loading slots 56.

Interposed between the cam followers 102 and the respective former devices 106 is a guide member 110 formed with elongated openings 112 (see FIGURE 5) through which the respective screws 104 extend.

The lower die plate 86 also reciprocably mounts a pair of spring pins 114 which ride in slots 116 formed in the peripheries of the respective cam followers 102, for the purpose of biasing cam followers 102, and consequently the former elements 106, toward each other and to the contracted positions of the forming device 108.

The cam pin 98 is actuated by a suitable hydraulic cylinder device, and for purposes of this description, it may be assumed that cam pin 98 is directly connected to the piston rod of such a device even though it is not shown.

The upper die plate structure 70 is also reciprocated by an appropriate hydraulic cylinder and piston arrangement, and is slidably mounted on guide rods 120 (see FIGURES 4 and 6) for alignment purposes, and, of course, it may be assumed that any other suitable conventional arrangement may be employed to either supplement or provide adequate alignment between the two die plate structures 70 and 72.

As the apparatus 60 is especially arranged to process pillow block type housings 12, the upper and lower die plates are recessed as at 122 to receive the feet or lugs 42 of the pillow block housing.

Prior to use, the upper die plate structure 70 of apparatus 60 is positioned sufficiently above the lower die plate 86 to permit application of a housing 12 to the recesses 122 in the lower swaging plate 86. When the lugs or feet 42 of a housing 12 of either of the forms shown in FIGURES 2 and 3A are disposed in the recesses 122 of the lower swaging plate 86, the housing portion 14 will be disposed in axial alignment with the spherically contoured swaging surface 88, and the end 49 of the housing portion will engage adjacent the outer end portion 123 of the surface 88 (the diameter of surface 88 and the other related portions of die plate 86 will be somewhat different for the different housing forms of FIGURES 2 and 3A, but the operation of the apparatus 60 is substantially the same in each case).

The cam pin 98 at the time of application of the housing to the die is withdrawn to approximately the dashed line position of FIGURE 4, which means that the former elements 106 will be in their contracted positions (spaced as close to each other as permitted by slots 112 of guide 110). In these positions former elements 106 will readily be received through the opening 50 that is defined by the bearing housing as the housing is put in operating position in apparatus 60. Also, cam follower members 102 will rest on surface 125 of base plate 94.

The operating sequence of the die apparatus 60 is started by raising the cam pin 98, which engages the cam followers 102 and moves them upwardly until the upper surfaces 99 of former elements 106 are disposed above the upwardly projecting end 48 of the bearing housing portion 14 (without bringing guide member 110 into contact with housing portion 14) in the position it assumes resting on swaging surface 88 (see FIGURE 4A). Such position of former elements 106 is reached when followers 102 engage stop surfaces 127 of die plate 86.

The upper die plate structure 70 is then brought downwardly to insert the projecting end 84 of the punch or cam member 82 in the space 132 between the former elements 106, and the cam surfaces 134 (see FIGURES 6 and 7) of the cam member engage the correspondingly angled cam surfaces 136 (see FIGURE 5) of the former elements 106 and move them outwardly to move their spherically contoured edge portions 109 toward engagement with the internal surface 52 of the housing portion 14.

Further downward movement of the upper die plate continues and the parts are proportioned so that as surface 140 of the punch or cam member 140 contacts surface 99 of former members 110, the spherically contoured surfaces 76 of the upper swaging die move into contact with the end 48 (see FIGURE 4A) of the housing portion 14, and the spherically contoured edge surfaces 85 of the plunger cam member projection 84 move into vertical alignment with the edge surfaces 109 of the former element 106, at which time the sizing or forming positions of the former members 106, that is necessary to define seat 16, is completed.

The pressure acting on the plungers in the respective hydraulic cylinders operating the cam pin 98 and the upper die plate structure 70 are further operated or controlled to continue the downward movement of the upper die plate structure 70 and thereby effect retraction of the cam pin 98. This portion of the die closure stroke effects the swaging action on housing portion 14 that bends it into conformity with the external surfaces defined by punch projection 84 and former elements 106. Preferably, the parts are so proportioned and the controls of the die are such that when the former elements 106 and punch projection 84 have been lowered approximately into a symmetrically centered position within housing portion 14 (see FIGURE 4), the swaging action involved will have completed the housing spherically contoured surface 16. Furthermore, the indicated position of punch projection 84 results in the formation of loading slots 56 in surface 16.

The upper die plate 74 in moving toward the lower die plate 86 during the swaging action of the die causes the material forming the housing portion 14 to flow to the configuration shown in FIGURE 3. If any mold parting line flash appears at inner corner 130 of the housing casting, the downward movement of the former elements toward their final swage positioning moves the flash outwardly of housing opening 50 and below housing end 49.

The final closed position of the die may be controlled by using a suitable stop arrangement, but I preferred to use a pressure control system whereby when the pressures causing swaging reaches a predetermined maximum (which will depend on the type of material being swaged), the swaging operation is stopped. In accordance with an operating embodiment of this invention, this predetermined pressure operates a pressure sensitive valve that initiates a reversal in the movement of the dies, but obviously the action desired may be achieved in a number of ways known to the art.

After the swaging is completed, upper die plate structure 70 and the cam pin 98 are fully retracted to permit removal of the completed bearing housing and receive the next one for similar processing. As the cam pin 98 is retracted and projecting end 84 of cam member 82 withdrawn from between former elements 106, the springs 115 move the former elements 106 to their contracted relation so that the completed housing 12 may be readily removed from the die.

It is here pointed out that the projection 84 of plunger or cam member 82 is provided with a pair of key elements 87 that are proportioned to fit in a complementary manner in slots 107 of the former elements 106. The keying elements 87 serve to insure, together with surface 140 of punch 82, that during the swaging portion of the die closure stroke the former elements 106 are accurately lined up and centered with respect to each other and to the punch or cam member projection 84 so that the bearing seat 16 will be of the desired circular configuration.

Turning now to the apparatus 62, this arrangement contemplates a reciprocable upper die plate structure 150 and a fixed lower die plate structure 152.

The upper die plate structure 150 is operably secured to a suitable hydraulic piston and cylinder arrangement of any suitable type for the purpose of moving the upper die plate 150 towards and away from the lower die plate structure. The upper die plate structure 150 carries an upper swaging die plate 151 formed with spherically contoured swaging surfaces 154 comparable to surfaces 76 (of FIGURE 6) which leads to a rounded recess 156, at the center of which is mounted a punch or cam member 158 that is secured to the die plate structure as by appropriate screws at its base 160, and which includes projecting portion 162 including an oblong head 163 formed with oppositely disposed T shaped projections 164 shaped to define cam surfaces 166 and 168 which cooperate with a pair of former elements 170 that define forming device 172 against which the housing portion 14 is swaged in accordance with this embodiment of the invention. The former elements 170 are formed with appropriate T shaped slots 174 to receive the T shaped projection 164, and include spherical contoured surfaces 171 that are equivalent to surfaces 109 of former elements 106.

As indicated in FIGURE 10, the punch or cam member head 163 includes laterally extending end portions 165 which are provided with spherically contoured edge portions 167 that are intended to complement the shape of the spherical contour of the spherically contoured portions 171 of the former elements 170 in the same manner as described in connection with surfaces 85 and 109 of the embodiment of FIGURES 4–7.

As indicated in FIGURES 8 and 9, the former elements 170 are respectively secured to a pair of pusher members 173, as by appropriate screws (not shown) that are received in aligned holes 175 and 175a of these components, and the associated former elements 170 and pusher members 173 are biased downwardly of the upper die plate 152 by appropriate compression springs 179. The angulation of the cam surfaces 164 and 166 guides or cams the former elements 170 toward their contracted positions (see FIGURE 9) under the biasing action of springs 179, and the former elements 170 are moved or cammed to their extended positions by lowering the top die plate structure 150 until the elements 170 are brought into engagement with the lower die plate surface 183, whereupon further downward movement of the top die plate structure 150 causes cam surfaces 164 and 166 to move former elements 170 away from each other to the positions suggested in FIGURE 8.

The lower die plate structure 152 comprises a lower swaging die plate 180 formed with an annular spherically contoured swaging surface 182 that is adapted to engage the end 49 of the housing portion 14. Surface 182 defines a rounded recess 181 that receives the bearing housing portion 14 as well as the former elements 170, the latter engaging against die surface 183 as top die plate structure moves downwardly toward swaging engagement with a housing 12. Surface 183 is shown indented somewhat to define curved shoulders 185 that serve as stops limiting movement of the former elements 170 away from each other.

In use, the apparatus 62 is placed in operation by separating the die plates, as by moving the top die plate structure 150 upwardly a suitable amount to permit insertion of a housing 12, the swaging die plates 151 and 180 being formed with recesses comparable to recess 122 for receiving the legs or lugs 42 of the pillow block type housing 12.

After a housing 12 has been applied to the lower swaging die 180 with its lugs 42 received in the lower swaging plate recesses 122 and its housing portion end 49 in engagement with the swaging surface 182, the top die plate structure 150 is moved downwardly to bring the former elements 170 into contact with the lower swaging plate structure. The former elements 170 in their contracted positions readily pass through the opening 50 that is defined by the housing portion 14, but as further downward movement of the top die plate structure 150 proceeds and elements 170 contact die surface 183, the relative movement between the cam member 158 and elements 170 causes the cam surfaces 164 and 166 to move the former elements 170 away from each other to bring their spherically contoured surfaces 171 into engagement with the internal surface 52 of the housing portion 14. In the meantime, the cam surfaces 190 of the plunger cam member 158 engage corresponding cam surfaces 192 of the former elements 170, and as the lower end 194 of the punch or cam member 158 engages the lower die plate 180, the swaging surfaces 154 of upper swaging plate 151 engage the end 48 of the housing portion 14, and the spherically contoured edges 167 move into alignment with the spherically contoured surfaces 171 of the former elements.

When the die components have reached the position of FIGURE 8, the former elements 170 are properly sized with respect to each other and the punch or cam forming member 158 to define a circular bearing seat 16 under the swaging action of swaging surfaces 154 and 182.

The projections 164 of cam member 158 and the grooves 174 of former elements 170 are made to substantially complement each other so that the projections 164 serve as keys to center and maintain the former elements 170 in proper alignment with each other and with the punch or cam member 158.

The procedures described above may be practiced on both the housing blanks of FIGURES 2 and 3A.

*Specific description of apparatus*

Returning now to the embodiment of FIGURES 4–7, the upper die plate structure 70 in practice may take any suitable form provided with the components previously described for the purpose of practicing this invention. The upper swaging plate 74 is affixed to head member 200 in any suitable manner as by employing suitable bolts 202 (see FIGURE 6) which are screw threaded into the head 200 and have their heads 204 received in recesses 206 formed in the plate 74 so that they will be flush with or below the swaging plate undersurface 208. As indicated in FIGURE 6, the head member 200 may be provided with a pair of fixed dowel pins 210 adapted to be received in holes 212 of the die plate 74 for centering purposes.

The head 200 may be of any conventional type and the structure shown is merely for illustrative purposes. The head 200 as shown may include an upstanding stud 214 (see FIGURE 4) adapted for direct connection to the piston rod of a suitable hydraulic piston head cylinder arrangement, either by screw threading or by pinning (or in any other suitable manner), so that the top plate structure 70 may be reciprocated in accordance with this invention.

The guide rods 120 that guide the movement of the top plate structure 70 may be fixedly secured in any suitable manner with respect to the lower die plate structure 72, although in the present instance, the base plate 94 is received over the guide posts 120 and fixed to base structure 96 by appropriate bolts or the like (not shown). The head 200 and the base plate 94 are provided with appropriate enlarged bosses 220 and 222 respectively that are formed with the respective bores 224 and 226 for closely receiving the guide pins or bars 120. In the case of the head 200, the bores 224 are defined by a suitable bearing sleeve structure 230, which may be formed from bronze or the like.

The upper swaging die plate 74 comprises a generally cylindrical member 232 formed from hardened steel or the like and shaped to define the spherically contoured surfaces 76 and the recess 78 that receives the punch or cam member 82, as well as the tapped bolt holes 234 for receiving bolts 80 that secure the punch or cam member 82 to plate 74 (plate 74 must also be appropriately drilled and tapped to receive respectively the bolts 202 and pins 210).

As indicated in FIGURE 6, the recess 78 is not circular, but rather is formed with oppositely disposed indentations 240, with the spherically contoured swaging surfaces 76 terminating on either side of the respective indentations 240, as at 242.

The punch or cam member 82 in addition to the projection 84 comprises a flanged base 244 proportioned to seat in the recess 78 and complement the outline of same, and thus the base 244 is provided with a pair of oppositely disposed extensions 246 that complement the indentations 240 and thus serve to center the punch or cam member 82 within recess 78. Extensions 246 may be omitted if so desired since bolts 80 can be relied on to properly hold the punch member 82 in its desired operating position.

The projection 84 of the punch or cam member 82 in the form illustrated in an integral part of the member 82, and it is formed to define an oblong, generally quadrilateral transverse cross-sectional configuration (see FIGURE 7), and as already indicated, this projection 84 defines camming surfaces 134 along its wide sides 250 and the spherically contoured edge surfaces 85 at the ends of its narrow sides 252. The narrow sides 252 extend substantially parallel to each other from the base 244 to the lines 256 (see FIGURE 7) where the spherically contoured surfaces 85 begin and are curved about the axial center 257 of punch or cam member 82 (see FIGURE 6), which is aligned with the axial center of the apparatus 60. The distance between the lines 256 where the surfaces 85 commence on either side of projection 84, and the end 258 of the projection 84 should be no greater than approximately one-half the length of the bearing housing portion 14 being processed so that the loading slot indentation that is formed in accordance with this invention is applied to only one end of the housing portion 14 (end 48 in the form illustrated).

As already indicated, the contour of the surfaces 85 should be made to complement the spherically contoured edge surfaces 109 of the former elements 106 so that when the projection 84 has been moved downwardly with respect to the elements 106 to the position where the portions of sides 252 corresponding to the location of lines 256 would be substantially aligned with the equator portion 260 of the elements 106, the lower portions of the elements 106 and projection 84 will define a completely circular spherically contoured forming surface within the housing portion 14. However, it is a function of the portions of the narrow sides 252 that are disposed above and adjacent the area where surfaces 85 begin (the location of the lines 256 on either side of the projection 84) to prevent any substantial bending over of the housing portion 14 at the positions where the loading slots 56 are being formed.

The projection 84 of punch or cam member 82 has its wide sides 250 recessed as at 262 to receive the respective keys 87. The recesses 262 should substantially complement the outline of the keys 87, particularly along the sides of the keys, to insure the proper alignment functioning of the latter. The keys 87 may be secured in place by appropriate screws 264 received in tapped holes 266 formed in the projection 84.

The base 244 of the punch or cam member 82 is bored as at 268 to receive the bolts 80 and counterbores 270 are provided to insure that the heads 272 of the bolts 80 will be disposed below the undersurface 140 of the member 82 when the latter has been secured in its operating position.

The lower swaging die plate 86 (see FIGURE 5) comprises a generally cylindrical member formed from hardened steel or the like to define the annular spherically contoured swaging surface 88 and the circular recess 90 (see FIGURE 4) as well as a counterbore 280 that receives the flanged ends 282 of the cam followers 102. The counterbore 280 defines the stop surfaces 127 that stop the upward movement of followers 102.

The plate 86 is also formed with bores 284 to receive the springs 115 and the spring pins 114; the outer ends of the bores 284 are tapped as at 286 to receive cover screws 288. The spring pins 114 each include a head portion 283 that is engaged by the respective springs 115, and a stem 285 which projects through the respective swaging plate openings 278 for engagement with cam followers 102. The openings 287 and stems 285 should be complementarily proportioned, in the manner suggested by FIGURE 4, to insure that the pins 114 move only straight in and out of openings 287 during operation of apparatus 60.

The lower swaging die plate is secured to the base plate 94 by appropriate bolts 290 (see FIGURE 5) which pass through appropriately formed bores (not shown) formed in the plate 86 for threading engagement with the base plate 94. The bores of plate 86 in which the bolts 290 are received preferably are counterbored as at 292 so that the heads 293 of bolts 290 may be positioned flush with or below the level of the top surface 294 of plate 86. Plate 86 is also formed with one or more bores 296 to receive a locating dowel pin 298 that is fixedly mounted in the base plate 94 for centering purposes.

The cam pin 98 is in the form of a cylindrical body 300 provided with a tapered end portion 302 defining the conical surface 100. The body 300 is internally threaded as at 304 for reception on drive rod 306 that may be the piston rod of an appropriate hydraulic piston and cylinder arrangement, it may be a connecting rod that is appropriately coupled to the reciprocating motion providing the device that is to be associated with cam pin 98.

The cam followers 102 in addition to their flanged ends 282 each include an upstanding circular wall 310 that is formed with the elongated groove 116 in which the spring pins 114 ride. The follower members 102 are each formed with a concave conical surface 312 that is shaped for camming engagement with the cam surface 100 of cam pin 98 for purposes of moving the cam followers 102 toward and away from each other under the action of cam pin 98 and spring pins 114. The cam followers 102 are also each formed with a pair of bolt holes 316 to receive the respective bolts or screws 104, and the holes 316 are counterbored as at 318 so that the heads of screws 104 will be received below the level of the respective cam surfaces 312.

The guide member 110 is in the form of a one-piece disc 320 formed to define the elongated recesses 112 through which the screws 104 pass. The guide member 110 is proportioned to slidably fit within the circular recess 90 of swaging die plate 86, and may have its sides that extend parallel to the recesses 112 exised as at 321 to permit debris to fall free of the former elements and down between the spaces 323 between the follower members 102 (see FIGURE 7) and past cam pin 98 to a point of disposal (opening or bore 92 of base plate 94 being appropriately slotted below spaces 323 for this purpose).

The former elements 106 of forming device 108 are formed from an appropriate hard material, such as hardened steel, and are each provided with a pair of tapped holes 330 in which the ends of screws 104 are received. The cam surfaces 136 of the elements 106 should substantially complement the respective surfaces 134 of the punch or cam member 87, and the side surfaces 335 of key receiving grooves 107 should substantially complement the sides 337 of the respective keys 87 and both surfaces 335 and 337 should be of sufficient depth to provide the former element centering and alignment functions that are contemplated by this invention.

The dimension of the former elements axially of the opening 50 of the housing 12 should be in excess of the length of the housing portion 14 along this axis to avoid the deformation of the housing portion over the ends of the spherically contoured edge surfaces 109.

Returning now to the embodiment 62 of FIGURES 8–16, the top plate structure 150 generally comprises a head member 340 to which the top swaging die 151 is secured in any appropriate manner, such as that shown in connection with apparatus 60. The head member 340 is appropriately connected to an operating hydraulic cylinder and piston arrangement, and its movement may be guided in any suitable manner, as by guide rods or the like, such as those shown in the embodiment of FIGURES 4–7.

The head member 340 in its illustrated form is bored as at 342 to receive the compression springs 344 that provide the biasing action on the former elements 170 of this invention. Head member 340 is also recessed as at 346 for reception of the base 348 of the punch or cam member 153 to which the latter is secured by appropriate screws or the like applied through holes 350 formed in the member 153.

The upper swaging plate 151 is fixed in any suitable manner to the head member 340, such as by the screw and dowel arrangement shown in connection with the embodiment of FIGURES 4–7. The plate 151 is round in configuration and is formed to define swaging surfaces 154 that have the same configuration as surfaces 76 of the embodiment of FIGURES 4–7. The recess 156 is undercut as at 352 to define spaced supporting shoulders 354 that support the respective pusher members 173. The shoulders 354 terminate in circular surfaces 356 corresponding to surfaces 358 FIGURES 4–7 (see FIGURE 6), and separating the shoulders 354 at either ends thereof are indentations (not shown) corresponding to indentations 240 shown in FIGURE 6.

The punch or cam member 153 in the embodiment of FIGURES 8–9 in addition to the base 160 comprises a projecting portion 162 in the form of a spindle shaped projection 360 having fixed to the projecting end thereof an oblong body 362 forming head 163 that has the same general transverse cross-sectional configuration as the projection 84 of the embodiment of FIGURES 4–7. The body 362 should have a dimension axially of the bearing housing portion 14 that exceeds the length of the bearing housing portion 14 along that axis (for the same reason stated in connection with the embodiment of FIGURES 4–7), and the spherically contoured edge portions 167 should start approximately at line 364 and extend downwardly to the end 366. As in the case of the embodiment of FIGURES 4–7, the body 362 is intended to fit between the former elements 170 and the configuration of surfaces 167 should complement the configuration of surfaces 171 of the former elements and the body 362 co-operates with the former elements 170 in the same manner as described in connection with the embodiment of FIGURES 4–7.

The T-shaped projections 164 defining cam surfaces 168 and 166 of the punch or cam member 158 are in the form of T-shaped structures 370 that are affixed to the body 362 in any suitable manner, and the proportioning of the structures 370 should be such that they closely fit within, and thus complement the shape of, the T-shaped grooves 174 of the former elements 170.

The former elements 170 of forming device 172 each comprise a semi-cylindrical base 372 and a spherically contoured forming portion 374 on which the spherically contoured surfaces 171 are formed. The slots 174 extend the length of the respective elements 170, and the bases 372 are formed with the tapped holes 175a that are to receive appropriate screws which are applied to the holes 175 of the pusher members 173.

The forming portion 374 of the former elements 170 should have a length axially of the bearing housing portion 14 that exceeds the length of such bearing housing portion 14 along that axis for the same reason described in connection with the embodiment of FIGURES 4–7.

The pusher members 173 each comprise a rounded wall 380 that merges into a flange 382 that engages over the respective shoulders 354 of the top swaging plate 151.

The respective pusher members 173 are appropriately formed to define the screw receiving openings 175, including counterbores 384 for purposes of making the screw heads flush with the top surfaces 386 of the members 173. The members 173 also include a web portion 388 which is formed with a circular recess 390 that complements the configuration of spindle portion 360 of the punch of cam member 158.

The lower swaging plate 180 is cylindrical in configuration and is fixed to any appropriate base or support structure 392 in any suitable manner, as by employing the screw and dowel arrangement shown in FIGURE 5. Lower plate 180 is also formed with the annular spherically contoured swaging surface 182 that is comparable to the swaging surface 88 of the embodiment of FIGURES 4–7.

The shaping and interrelation of the parts of this embodiment should be such that when the die plates have reached the full closure position of FIGURE 8, the body 362 of the punch or cam member 158 will be received between the former elements 170 with its spherically contoured edge surfaces 167 in complementing relation with the spherically contoured surfaces 171 of the former elements 170. In this position, the line 364, that is, the point where the spherically contoured edge surfaces 167 begin, will be approximately aligned with the equator portion 394 of the former elements 170. This will insure the provision of a bearing seat 16 which is spherically contoured about the end 49 of the housing portion 14, but is provided with loading slots 56 at the end 48 of the housing portion 14.

*Distinguishing characteristics of the invention*

It will therefore be seen that I have provided a method and apparatus of making ball bearing units in which the housing portion of the bearing housing is simultaneously formed with a spherically contoured bearing seat and oppositely disposed bearing assembly loading slots, without using the outer race as a forming member. Furthermore, the manner in which I have formed the housing bearing seat and loading slots permits the use of a one-piece housing while providing for selective application to the housing of ball bearing assemblies for different applications.

The process provided for by this invention not only avoids the preassembling of bearing assemblies within housings, but also permits the use of housings as they come from the molds or forging dies without any machining whatsoever, except for perhaps the grinding of the undersurfaces of the feet or lugs 42 to provide true mounting surface.

In one commercial form of the bearing unit shown in FIGURE 1, the housing 12 is formed from malleable iron and the entire housing is electrically coated with cadmium plating. Other than the forming procedures called for by this invention, no other machining or processing is required unless the undersurfaces of the lugs or feet 42 are to be machined for accurate fitting purposes.

The manner of obtaining the die movement described above is largely optional. While a hydraulically operated arrangement has been described, the same movements can be achieved using a mechanically operated arrangement, such as a crank type press.

The term "ductile" as employed in the appended claims means all materials of the type mentioned in the specification as well as all suitable materials of the ductile or malleable type.

The terms "massive structure type housing member" and "massive structure type housing portion" as used in the appended claims means cast or forged ball bearing assembly housing members and portions of the general types shown in the appended drawings, as distinguished from sheet metal housing members and portions, examples of which are disclosed in Noe Patent 2,794,691.

The term "bearing assembly" as used in this specification and in the appended claims is intended to mean the combination of the inner and outer race members and the ball bearing elements associated therewith.

The concepts described hereinbefore are obviously applicable to the making of other forms of ball bearing units, such as for instance those of the flange type, it only being necessary that the die swaging plates be appropriately formed to accommodate the different shape of housing.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. Apparatus for forming a spherically contoured bearing seat in an annular bearing housing portion of a bearing housing member, said apparatus comprising:
   a circular contractible forming device adapted to be disposed within said housing portion and including a plurality of coplanar former elements having convexly curved spherically contoured external edge surfaces, with said former elements being disposed to position said edge surfaces at the periphery of said forming device,
   said elements being mounted for movement toward and away from each other between a retracted forming device position in which the housing portion may be received in circumambient relation about said former device, and an extended forming device position in which said forming device edge surfaces are disposed in abutting relation with the internal surface of said housing portion,
   punch means for pressing said forming device elements against the internal surface of the housing portion, said punch means comprising a projecting member provided with cam surfaces proportioned to be received between said forming device elements and cam same to said extended position of said forming device when said punch member is moved in one direction with respect to said forming device, said punch member being proportioned to extend across a diameter portion of said forming device and having side edges disposed substantially normally of said forming device and defining convexly curved spherically contoured edge surfaces adjacent the projecting end thereof that complements said forming device edge surfaces, means for forcing said punch member in said one direction between said device elements to move same to their extended positions when the housing portion has been positioned about asid forming device, and means for swaging the housing portion against said former element edge surfaces.

2. Apparatus for forming a spherially contoured bearing seat in an annular bearing housing portion of a bearing housing member, said apparatus comprising:

a circular contractible forming device adapted to be disposed within said housing portion and including a plurality of coplanar former elements having convexly curved spherically contoured external edges surfaces, with said former elements being disposed to position said edge surfaces at the periphery of said forming device, said elements being mounted for movement toward and away from each other between a retracted forming device position in which the housing portion may be received in circumambient relation about said former device, and an extended forming device position in which said forming device edge surfaces are disposed in abutting relation with the internal surface of said housing portion, punch means for pressing said forming device elements against the internal surface of the housing portion, said punch means comprising a punch member mounted for movement axially of said forming device and including cam surfaces proportioned to be received between said forming device elements and cam same to said extended position of said forming device when said punch member is moved to bring said cam surfaces into engagement with said device elements, means for forcing said punch member between said device elements to move same to their said extended positions, and means for swaging the housing portion against said former elements.

3. The apparatus set forth in claim 2 including keying means cooperating between said punch member and said former elements for centering said former elements with respect to each other.

4. Apparatus for forming a spherically contoured bearing seat in an annular bearing housing portion of a bearing housing member, said apparatus comprising:

a circular contractible forming device adapted to be disposed within said housing portion and including a plurality of coplanar former elements having convexly curved spherically contoured external edge surfaces, with said former elements being disposed to position said edge surfaces at the periphery of said forming device, said elements being mounted for movement toward and away from each other between a retracted forming device position in which the housing portion may be received in circumambient relation about said former device, and an extended forming device position in which said forming device edge surfaces are disposed in abutting relation with the internal surface of said housing portion, punch means for pressing said forming device elements against the internal surface of the housing portion, said punch means comprising a punch member mounted for movement axially of said forming device and including cam surfaces proportioned to be received between said forming device elements and cam same to said extended position of said forming device when said punch member is moved to bring said cam surfaces into engagement with said device elements, means for forcing said punch member between said device elements to move same to their said extended positions, and means for swaging the housing portion against said former elements, said punch member including edge portions on diametrically opposed sides thereof proportioned to define diametrically opposed bearing assembly loading slots in the housing portion when said die member surfaces are brought into swaging relation with said housing portion.

5. The apparatus set forth in claim 4 wherein said swaging means comprises:

first and second opposing die members formed with aligned spherically contoured swaging surfaces adapted to engage against the ends of said housing portion, and means for bringing said die members into swaging relation with said housing portion.

6. The apparatus set forth in claim 5 wherein both of said die members are movably mounted:

and including means for prepositioning said former elements and said punch member to define said seat prior to swaging of the housing portion.

7. The apparatus set forth in claim 5 wherein one of said die members is fixedly mounted.

8. Apparatus for forming a spherically contoured bearing seat in an annular bearing housing portion of a bearing housing member, said apparatus comprising:

a circular contractible forming device adapted to be disposed within said housing portion and comprising a pair of former elements having convexly curved spherically contoured external edges surfaces with said former elements being disposed to position said edge surfaces at the periphery of said forming device, said elements being mounted for movement toward and away from each other between a retracted forming device position in which the housing portion may be received in circumambient relation about said former device, and an extended forming device position in which said forming device edge surfaces are disposed in abutting relation with the internal surface of said housing portion, a punch member mounted for movement axially of said forming device and including cam surfaces proportioned to be received between said forming device elements and cam same to said extended position of said forming device when said cam member is moved to bring said cam surfaces into engagement with said device elements, means for forcing said punch member between said device elements to move same to their said extended positions, and means for swaging said housing portion against said former element edge surfaces.

9. Apparatus for simultaneously forming a spherically contoured bearing seat and bearing assembly loading slots in an annular bearing housing portion of a bearing housing member, said apparatus comprising:

a circular contractible forming device adapted to be disposed within said housing portion and comprising a pair of former elements having convexly curved, spherically contoured external edge surfaces with said former elements being disposed to position said edge surfaces adjacent the periphery of said forming-device when the housing portion has been positioned about said forming device, said elements being mounted for movement toward and away from each other between a retracted forming device position in which the housing portion may be received in circumambient relation about said former device, and an extended forming device position in which said forming device edge surface will be disposed in abutting relation with the internal surface of said housing portion when the housing portion has been positioned about said forming device, and a punch member mounted for movement axially of said forming device comprising a projecting member provided with cam surfaces proportioned to be received between said forming device elements and cam same to said extended position of said forming device when said punch member is moved in one direction with respect to said forming device, said punch member being proportioned to extend across a diameter portion of said forming device and having side edges disposed substantially normally of said forming device and defining convexly curved spherically contoured edge surfaces adjacent the projecting end thereof that complement said forming device edge surfaces, keying means cooperating between said punch member and said former elements for centering said former elements with respect to each other and said punch member edge portions, means for forcing said punch member in said one direction between said device elements to move same to their said extended positions when the housing portion has been positioned about said forming device, and means for swaging said housing portion against said punch member and former element edge surfaces to form said seat in said housing portion.

10. The apparatus set forth in claim 9 wherein said swaging means comprises:

first and second opposing die members formed with aligned spherically contoured annular swaging surfaces proportioned to engage against the exterior of said housing portion when same has been positioned about said forming device, said forming device being carried by one of said die members, and means for bringing said die members into swaging relation with said housing portion.

11. The apparatus set forth in claim 10 wherein:

said punch member is carried by the other of said die members, said one die member includes a reciprocably mounted cam pin mounted for movement axially of said forming device and aligned with said cam member, said former elements being mounted for movement axially of said forming device, said former elements and said cam pin including mutually engaging cam surfaces proportioned to separate said elements as said cam pin is moved in the direction of said other die member, and wherein said apparatus includes means for reciprocating said cam pin, and resilient means for biasing said forming device elements toward the retracted forming device position.

12. The apparatus set forth in claim 10 wherein:

said punch member is carried by said one die member,
said forming device elements being slidably mounted on said punch member, and wherein said apparatus includes means for biasing forming device elements toward the retracted forming device position, said one die member being mounted for movement toward and away from said other die member under the action of said bringing means, means for securing said other die to serve as an abutment, said cam surfaces being proportioned to cam said forming device elements to said retracted position with respect to said punch member, said punch member on sufficient movement of said one die member toward said other die to bring said forming device elements into contact with said other die member camming said device elements into said extended position of said forming device.

13. The method of shaping an annular rolling bearing housing blank to receive an externally contoured outer bearing race which includes swaging the housing about a spherically contoured contractible forming device having diametrically opposed squared portions shaped to define loading slots, then contracting said device to remove the housing therefrom.

14. The method of making an annular rolling bearing housing blank which includes taking an annular blank formed from a ductible material and simultaneously forming a spherically contoured annular bearing seat within said blank and diametrically opposed outer bearing race loading slots in one side wall of said seat.

15. The method of making an annular rolling bearing housing blank which includes taking an annular blank formed from ductible material, swaging the blank about a former to simultaneously define a spherically contoured annular bearing seat within said blank and diametrically opposed outer bearing race loading slots in one side wall of said seat, and removing the former from within the housing blank.

16. The method of making a rolling bearing which includes taking an annular blank formed from ductible material, swaging the blank about a former to simultaneously form a spherically contoured annular bearing seat within said blank and diametrically opposed outer bearing race loading slots in one side wall of said seat, removing the former from within the housing blank, and then applying an assembled ball bearing assembly to said seat by inserting same through said loading slots and turning same into the plane of said seat.

17. The method of making an annular rolling bearing housing blank which includes taking an annular massive structure type housing blank formed from a ductible material, and swaging the ends thereof to deflect same toward the axis of said blank while bracing diametrically opposed portions of one end of the blank against bending movement to define rolling bearing assembly loading slots.

References Cited by the Examiner
UNITED STATES PATENTS

| | | | |
|---|---|---|---|
| 1,009,586 | 11/11 | Schmidt | 308—194 |
| 1,266,061 | 5/18 | Scoville | 29—149.5 |
| 2,158,312 | 5/39 | Terrell. | |
| 2,794,691 | 5/57 | Noe | 308—72 |
| 2,952,898 | 9/60 | Glavan | 29—148.4 |
| 2,952,899 | 9/60 | Glavan | 29—148.4 |
| 3,001,841 | 9/61 | Glavan | 29—149.5 |

WHITMORE A. WILTZ, Primary Examiner.

THOMAS H. EAGER, Examiner.

UNITED STATES PATENT OFFICE
CERTIFICATE OF CORRECTION

Patent No. 3,189,979                                                         June 22, 1965

Gerald Wayne Richmond

It is hereby certified that error appears in the above numbered patent requiring correction and that the said Letters Patent should read as corrected below.

Column 13, line 19, for "asid" read -- said --; line 22, for "spherially" read -- spherically --; same column 13, line 28, and column 14, line 44, for "edges", each occurrence, read -- edge --; column 16, lines 26, 32, 39 and 50, for "ductible", each occurrence, read -- ductile --.

Signed and sealed this 22nd day of February 1966.

(SEAL)
Attest:

ERNEST W. SWIDER                                            EDWARD J. BRENNER
Attesting Officer                                                      Commissioner of Patents